(12) United States Patent  
Justin et al.

(10) Patent No.: US 8,725,339 B2  
(45) Date of Patent: May 13, 2014

(54) METHOD FOR CONTROLLING A HYBRID TRACTION ASSEMBLY AND HYBRID VEHICLE CONTROLLED ACCORDING TO SUCH A METHOD

(75) Inventors: Thomas Justin, Brignais (FR); Michael Millet, Moidieu Detourbe (FR)

(73) Assignee: Renault Trucks, St. Priest (FR)

( * ) Notice: Subject to any disclaimer, the term of this patent is extended or adjusted under 35 U.S.C. 154(b) by 0 days.

(21) Appl. No.: 13/990,445

(22) PCT Filed: Dec. 22, 2010

(86) PCT No.: PCT/IB2010/003496  
§ 371 (c)(1),  
(2), (4) Date: May 30, 2013

(87) PCT Pub. No.: WO2012/085614  
PCT Pub. Date: Jun. 28, 2012

(65) Prior Publication Data  
US 2013/0274984 A1    Oct. 17, 2013

(51) Int. Cl.  
*G06F 7/00* (2006.01)  
*B60W 10/08* (2006.01)  
*B60W 10/06* (2006.01)  
*B60W 20/00* (2006.01)

(52) U.S. Cl.  
CPC .............. *B60W 10/08* (2013.01); *B60W 10/06* (2013.01); *B60W 20/00* (2013.01); *Y02T 10/6286* (2013.01); *Y02T 10/7077* (2013.01)  
USPC .... 701/22; 180/65.21; 180/65.23; 180/65.25; 180/65.27; 180/65.28; 477/3

(58) Field of Classification Search  
CPC ..... B60W 10/08; B60W 10/06; B60W 20/00; Y02T 10/6286; Y02T 10/7077  
USPC .......... 701/22; 180/65.8, 65.21, 65.23, 65.25, 180/65.27, 65.28, 65.29, 65.245, 65.285, 180/69.6, 165; 903/903, 910, 916, 917, 903/918, 930, 945, 952, 906, 946, 951; 257/E29.266, E21.421, E29.264; 320/101, 104, 132, 150; 250/208.1, 250/216; 310/113, 114; 477/3, 463; 322/16; 475/5  
See application file for complete search history.

(56) References Cited

U.S. PATENT DOCUMENTS 5,327,987 A * 7/1994 Abdelmalek .............. 180/65.25  
6,196,344 B1 * 3/2001 Tamor ........................ 180/65.25  
(Continued)

FOREIGN PATENT DOCUMENTS

EP    1383224 A1    1/2004  
EP    1932740 A1    6/2008  
(Continued)

OTHER PUBLICATIONS

International Search Report (Aug. 16, 2011) for corresponding International application No. PCT/IB2010/003496.

*Primary Examiner* — McDieunel Marc  
(74) *Attorney, Agent, or Firm* — WRB-IP LLP

(57) ABSTRACT

A method for controlling a hybrid traction assembly includes an initial depleting phase which begins at the beginning of the vehicle mission and where the hybrid traction assembly is controlled to cause depletion of the storage device at a high first mean depletion rate, at least one sustaining phase where the hybrid traction assembly is controlled so that the state of charge is maintained in a predetermined sustaining range. The method further includes a second depleting phase which extends between the initial depleting phase and the sustaining phase, wherein the hybrid traction assembly is controlled to cause depletion of the storage device at a second mean depletion rate, the second mean depletion rate being lower than the first mean depletion rate.

13 Claims, 3 Drawing Sheets

(56) References Cited

U.S. PATENT DOCUMENTS

| | | | |
|---|---|---|---|
| 7,849,944 B2* | 12/2010 | DeVault | 180/65.29 |
| 8,140,204 B2* | 3/2012 | Okubo et al. | 701/22 |
| 2009/0114463 A1* | 5/2009 | DeVault | 180/65.29 |
| 2011/0166732 A1* | 7/2011 | Yu et al. | 701/22 |
| 2011/0166733 A1* | 7/2011 | Yu et al. | 701/22 |
| 2012/0053010 A1* | 3/2012 | Kuang et al. | 477/3 |
| 2012/0253575 A1* | 10/2012 | Le Brusq et al. | 701/22 |

FOREIGN PATENT DOCUMENTS

| | | |
|---|---|---|
| EP | 2068417 A1 | 6/2009 |
| WO | 2007066023 A1 | 6/2007 |

\* cited by examiner

METHOD FOR CONTROLLING A HYBRID TRACTION ASSEMBLY AND HYBRID VEHICLE CONTROLLED ACCORDING TO SUCH A METHOD

BACKGROUND AND SUMMARY

The present invention relates to a method for controlling a hybrid traction assembly of a vehicle. Besides, the present invention relates to an automotive vehicle, especially an industrial plug-in hybrid vehicle, which can be controlled according to such a method.

A prior art hybrid vehicle usually has a hybrid traction assembly which can comprise an internal combustion engine, at least one electric reversible machine for performing traction of the hybrid vehicle and for generating electric regenerative energy when the vehicle slows down, and an electric energy storage device comprising, if it is of the co-called "plug-in" type, a connector for connection to the grid. Sometimes, instead of a reversible machine, a prior art hybrid vehicle can comprise an electric motor and an electric generator.

In a parallel type hybrid, both the internal combustion engine and the electric machine may provide torque to the driveline of the vehicle. The electric machine retrieves or delivers electric energy from/to an electric energy storage device which may comprise a set of electrochemical batteries, super-capacitors, etc.

In a series type hybrid, the internal combustion engine is not mechanically coupled to the vehicle driveline and delivers mechanical power to a first electrical machine which is mainly used as a generator. The electric energy produced by the generator is fed to one or several second electrical machine(s), preferably reversible. Said second electric machine is mechanically connected to the vehicle driveline so as to deliver driving torque to the vehicle driveline when used as a motor during motoring phases or to retrieve torque from the driveline when used as a generator during braking phases. Both electrical machines retrieve or deliver electric energy from/to at least one common electrical energy storage device which may comprise electrochemical batteries, super-capacitors, etc.

Other types of hybrids are known such as the so-called series-parallel where a power split device splits the torque from the engine between the vehicle driveline and a generator, while an electric machine is also connected to the vehicle driveline The vehicle may comprise one or several electronic control units adapted to control the internal combustion engine and the electrical machine(s) in order to control directly or indirectly the amount of torque delivered or retrieved by each of internal combustion engine and electric machine(s). Electronic control units can thereby control the speed and/or the torque of the internal combustion engine and can also control the electrical power retrieved/delivered by the electric machine(s) from/to the electric energy storage device. It is quite common in the field of hybrid vehicles to have an electronic control unit which may implement several control strategies. Some of these strategies can be centred on seeking to maintain the state of charge of the electric energy storage device within a predefined window around a state of charge target. The state of charge target or target window can depend on various parameters, including vehicle speed, vehicle weight, battery state of health, etc. One easy way to modify at least partly the strategy is to change the state of charge target or target window and/or to change the way it is determined. For example, if the state of charge target is defined by a formula depending on a certain number of parameters, a change of strategy can be obtained by giving a fixed predetermined value to the state of charge target or target window, or by modifying the formula by which it is determined. In any case, modifying a state of charge target or a state of charge target window will be equivalent.

Some electric hybrid vehicles, which can be of the series, parallel or series-parallel type, are of the so-called plug-in type, meaning that their electrical energy storage device can also be charged when the vehicle is stopped by being connected to an external source of electric energy, such as the power grid. Such plug-in vehicles typically have an electrical energy storage device of larger capacity, mainly based on a set of electrochemical batteries.

A prior art controlling method for controlling such a plug-in hybrid electric vehicle usually comprises:

a connection phase for charging the battery set at a high level before the beginning of a vehicle mission;

a high rate depleting phase where the battery set delivers electric traction energy at the highest possible depletion rate; and a sustaining phase where the state of charge is maintained in a sustaining range.

The high rate depleting phase corresponds to the fact that the battery set discharge or depletion is promoted at a discharge rate which is preferably close to the maximum possible discharge rate for the battery set at the instant operating conditions. For example, the electronic control unit can control the vehicle so that the discharge rate is, if possible, above 80% of the available discharge rate. In practice, the vehicle is controlled so that its required traction energy is delivered to the maximum possible extent by the electric machine which is supplied by the battery set. For instance in a parallel hybrid configuration, such a maximum possible extent may preferably correspond to a significant part of the total hybrid traction power, say 80% or more, versus a small amount of power delivered by the internal combustion engine, say less than 20%. In a series-hybrid vehicle, this may imply that the electric motor(s) retrieve(s) its energy from the storage device rather than from the electric generator.

The high rate depleting phase ends when the state of charge of the battery set reaches the sustaining range, thus triggering the sustaining phase. In the sustaining phase, the actual battery state of charge oscillates within the narrow sustaining range, with the battery set sometimes recovering small amounts of energy from the electric generator and sometimes delivering small amounts of energy to the electric traction motor. Typically, during the sustaining phase, the state of charge of the battery set will be maintained between 40 percent and 60 percent of its total capacity. In case where the vehicle mission is relatively long, the sustaining phase lasts longer than the high rate depleting phase.

This prior art controlling method makes it possible to somewhat downsize the internal combustion engine. Indeed, the electric traction motor can boost the total hybrid traction power and thus compensate for the power loss resulting from this downsizing.

This prior art controlling method which is common to many vehicles is not desirable from many standpoints.

First of all, the prior art controlling method induces a big difference in the way the vehicle behaves during the two main phases, i.e. during the high rate depleting phase and the sustaining phase. Indeed, the performance, the noise and the emissions of the vehicle will be dramatically different between those two main phases.

Besides, controlling a battery set with a short but strong depleting phase followed by a long sustaining phase may shorten the service life of the storage device.

It therefore appears that, from several standpoints, there is room for improvement in the field of plug-in hybrid vehicles.

It is desirable to provide a controlling method avoiding the afore-mentioned disadvantages.

Accordingly, one subject-matter of an aspect of the present invention is a method for controlling a hybrid traction assembly of a hybrid vehicle, the hybrid traction assembly comprising at least:

an internal combustion engine;

at least one electric machine which can be mechanically coupled to the driving wheels so as to perform traction of the hybrid vehicle, the at least one electric machine being suitable for generating electric regenerative energy when the hybrid vehicle slows down;

a storage device suitable for delivering electric traction energy to the electric machine and for recovering electric regenerative energy from the electric generator, wherein the storage device can be connected to an external source of electric power so as to charge the storage device at a high state of charge before a beginning of a vehicle mission;

wherein the method comprises:

an initial depleting phase which begins at the beginning of the vehicle mission and where the hybrid traction assembly is controlled to cause depletion of the storage device at a first mean depletion rate, the first mean depletion rate being a high depletion rate;

at least one sustaining phase where the hybrid traction assembly is controlled so that the state of charge is maintained in a predetermined sustaining range;

the method being characterized in that it further comprises a second depleting phase which extends between the initial depleting phase and the sustaining phase, wherein the hybrid traction assembly is controlled to cause depletion of the storage device at a second mean depletion rate, the second mean depletion rate being lower than the first mean depletion rate.

In the present application, a state of charge (SOC) refers to the state of charge of a battery set, and a mean depletion rate refers to a ratio between a variation of the state of charge over a time variation.

In other words, a controlling method according to the present invention has an overall depletion phase, where the state of charge decreases down to the sustaining range under two successive mean depletion rates, instead of only one high depletion rate for a prior art controlling method.

These and other features and advantages will become apparent upon reading the following description in view of the drawing attached hereto representing, as non-limiting examples, embodiments of a hybrid vehicle according to an aspect of the invention and of a controlling method according to an aspect of the invention.

BRIEF DESCRIPTION OF THE DRAWINGS

The following detailed description of several embodiments of the invention is better understood when read in conjunction with the appended drawing being understood, however, that the invention is not limited to the specific embodiments disclosed. In the drawings.

DETAILED DESCRIPTION

Figure 1:
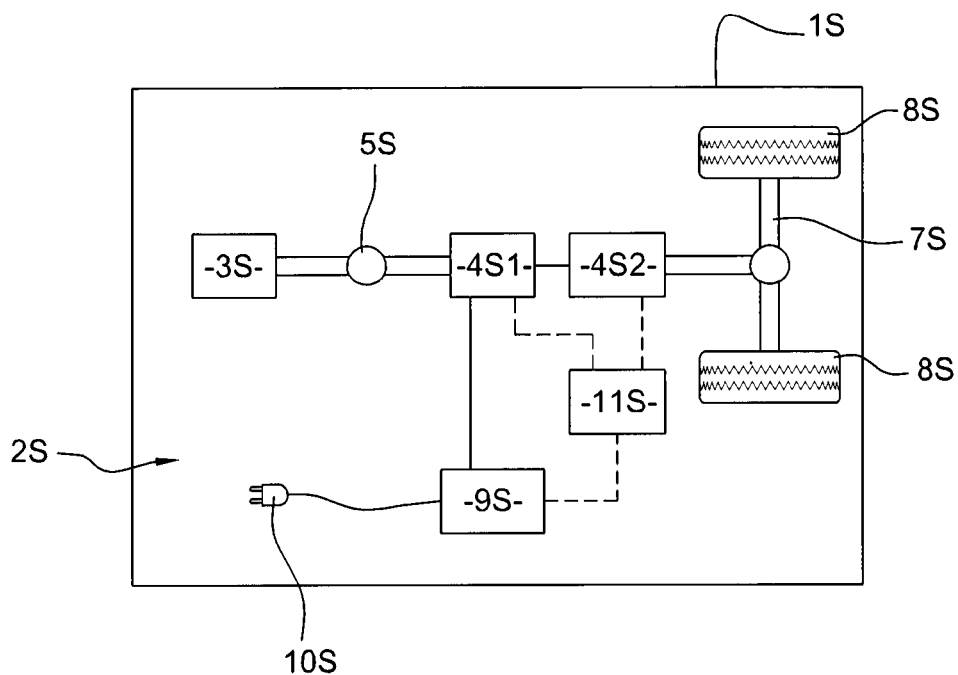
FIG. 1 is a schematic view of a hybrid vehicle according to a first embodiment of the invention.

FIG. 1 depicts a hybrid vehicle 1 S according to a first embodiment of the present invention, for instance an industrial vehicle, which has a hybrid traction assembly 2S. Hybrid vehicle 1 is of the series hybrid type. Hybrid traction assembly 2S comprises an internal combustion engine 3S and two electric machines 4S1, 4S2. The internal combustion engine 3S is coupled to one of the electric machine 4S1 which operates mainly as a generator to produce electrical current. The second electric machine 4S2 mostly works as an electric traction motor, etc.

Advantageously, the electric machines 4S1, 4S2 can be reversible machines. They can for example be brushless direct current motors with permanent magnets, alternate current induction motors.

The second electric machine 4S2 can work as an electric generator, for generating electric regenerative energy when the hybrid vehicle 1 S slows down or brakes. When any decelerating command is given, e.g. when the brake pedal is depressed, this electric machine 4S2 can generate electric regenerative energy at an electric regenerative power which depends on the braking force applied.

The internal combustion engine 3S can be coupled to the electric machine 4S1 via a coupling unit 5S such as for example a gear redactor. Besides, the electric machine 4S2 that mostly works as a motor is mechanically coupled to the driving wheels 8S through a driveline which comprises for example wheels shafts 7S.

Hybrid traction assembly 2S also comprises a battery set 9S, for delivering and/or retrieving electric traction energy to or from the electric machines 4S1, 4S2. The battery set 9S is an electric energy storage device and it can comprise several not shown, interrelated electrochemical battery cells. The battery set 9S comprises a connector 10S for connection to a not shown external source of electric power. Such external source can be a grid.

Hybrid traction assembly 2S further comprises an electronic control system 11S, which may comprise a computer or processor, suitable for controlling the hybrid traction assembly 2S so as to carry out a controlling method according to the present invention. In particular, electronic control system 11S helps controlling the electric energy and power delivered to and/or provided by the electric machine 4S1, 4S2 and the speed and torque of electric machines 4S. The electronic control system can comprise several distinct electronic control units, which may comprise a computer or processor, having for controlling respective components. It can also control the internal combustion engine.

Figure 2:
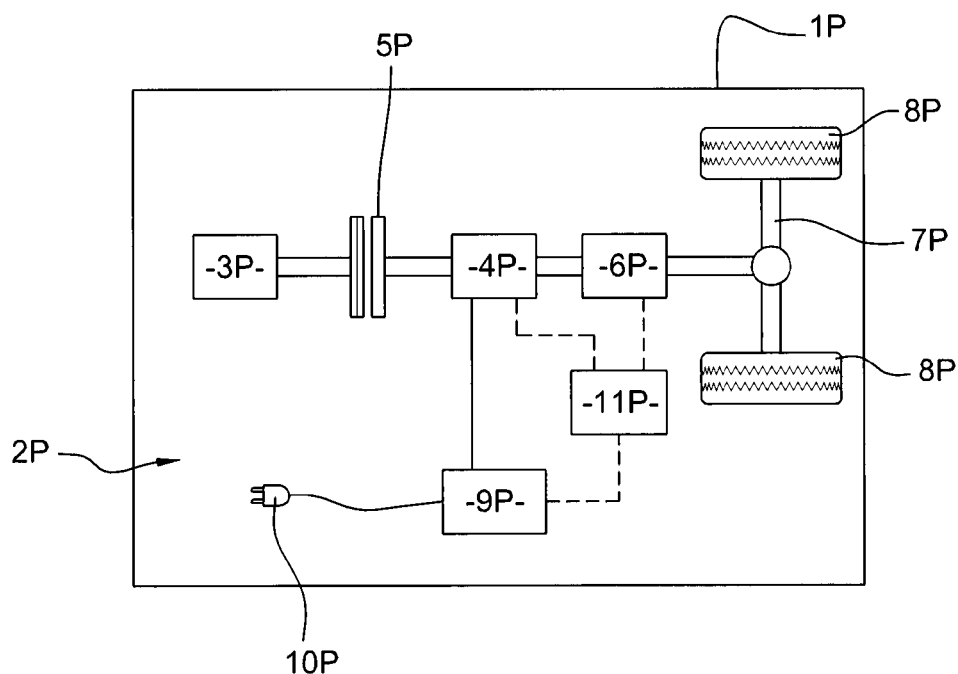
FIG. 2 is a schematic view of a hybrid vehicle according to a second embodiment of the invention.

FIG. 2 depicts a hybrid vehicle 1 P according to a second embodiment of the present invention, for instance an industrial vehicle, which has a hybrid traction assembly 2P. Most of the parts of hybrid vehicle 1 P have structures and/or functions that are quite similar to the structures and/or functions of the corresponding parts of hybrid vehicle 1 S depicted on FIG. 1. Hence, the afore-stated description of hybrid vehicle 1 S given in relation to FIG. 1 can be transposed to hybrid vehicle 1 P of FIG. 2, except for the hereafter-stated differences.

In most cases, the reference sign of a part of hybrid vehicle 1 P can be derived, by replacing suffix letter S by suffix letter P, from the reference sign of the part of hybrid vehicle 1 S that has the corresponding structure and/or function. One can thus define:
- hybrid vehicle 1 P;
- a hybrid traction assembly 2P;
- an internal combustion engine 3P;
- an electric machine 4P;
- a transmission 6P;
- wheel shafts 7P;
- driving wheels 8P;
- a battery set 9P;
- a connector 10P; and
- an electronic control system 1 1 P.

Hybrid vehicle 1 P differs from hybrid vehicle 1 S, because hybrid vehicle 1 P is of the parallel hybrid type, whereas hybrid vehicle 1 S is of the series type. Hence, both the internal combustion engine 3P and the electric machine 4P can independently perform traction of the hybrid vehicle 1 P. Besides, the internal combustion engine 3P can be coupled to the electric machine 4P via a clutch 5P. Both the internal combustion engine 3P and the electric machine 4P are mechanically coupled to a transmission 6P, such as a gearbox. Clutch 5P permits to engage and disengage the internal combustion engine 3P from transmission 6P.

The electric machine 4P is preferably reversible so as to be able to generate electric regenerative energy when the vehicle slows down or brakes. Alternatively, an electric motor and an electric generator can be formed as two distinct units.

The operation of hybrid vehicle 1 S or 1 P is now described with reference to FIG. 3, which illustrates the course of a controlling method according to a first embodiment of the present invention, extending on a whole vehicle mission. The operation of hybrid parallel vehicle 1 P can be similar to the operation of hybrid series vehicle 1 S.

A vehicle mission corresponds to the period extending between two plug-in operations for recharging the battery set 9S, 9P, i.e. between two pluggings of connector 10S, 10P to a grid for charging battery set. Such a mission may last a few hours, one day or more. During a mission, the vehicle can typically drive between a loading station and an unloading station, e.g. a warehouse, or come back to the initial loading station. As will be described hereunder, several possibilities exist as to how to determine the duration of the vehicle mission, i.e. when is expected the end of the vehicle mission.

Before the beginning of the vehicle mission, the battery set 9S, 9P gets charged at a high state of charge. Preferably, the battery set gets charged at a full charge limit C1, which corresponds to highest possible state of charge, usually about 90% of the nominal capacity. Indeed, charging over the full charge limit C1 might shorten the service life of the battery set.

Figure 3:
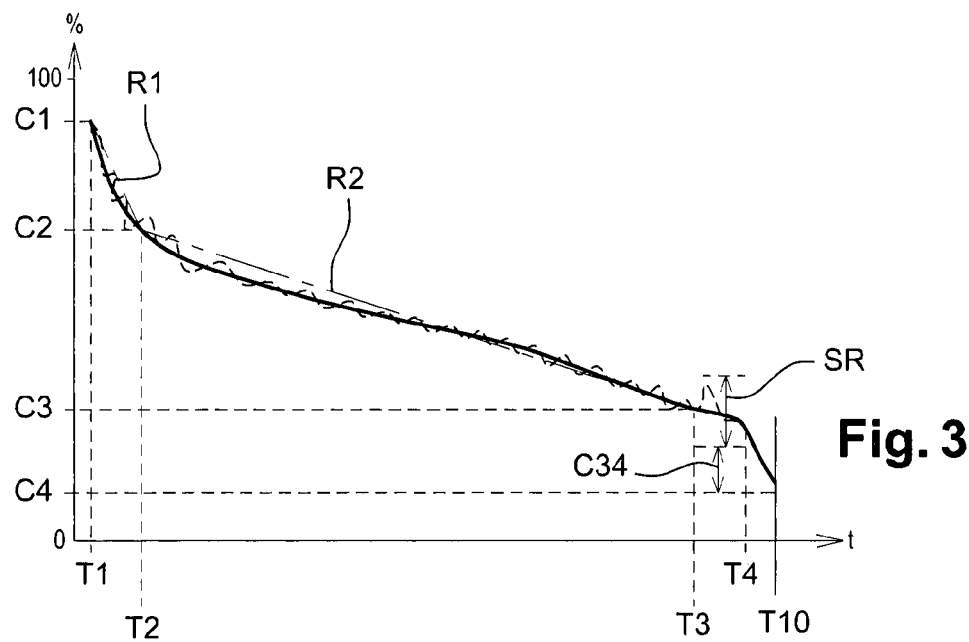
FIG. 3 is a diagram illustrating a controlling method according to a first embodiment of the invention for controlling the hybrid vehicle of FIG. 1 or 2.

The controlling method of FIG. 3 comprises several main steps or phases which are separate by specific times designated as T1, 12, T3, T4 and T10, namely:
- an initial depleting phase extending between times T1 and T2 and hence designated as T2–T1;
- a second depleting phase extending between times T2 and T3 and hence designated as T3–T2
- a sustaining phase extending between times T3 and T4 and hence designated as T4–T3; and
- a final phase extending between times T4 and T10 and hence designated as T10–T4;

The initial depleting phase T2–T1 begins at time T1, when the vehicle mission begins and where the battery set 9S, 9P is charged at its fall charge limit C1. During the initial depleting phase T2–T1 between times T1 and T2, the electronic control system 1 1 S controls the hybrid traction assembly 2S, 2P to cause a depletion of the battery set at a first mean depletion rate R1. In the present application, "depletion" corresponds to the discharge of the electric energy storage device, i.e. to a decrease in its state of charge.

Figure 4:
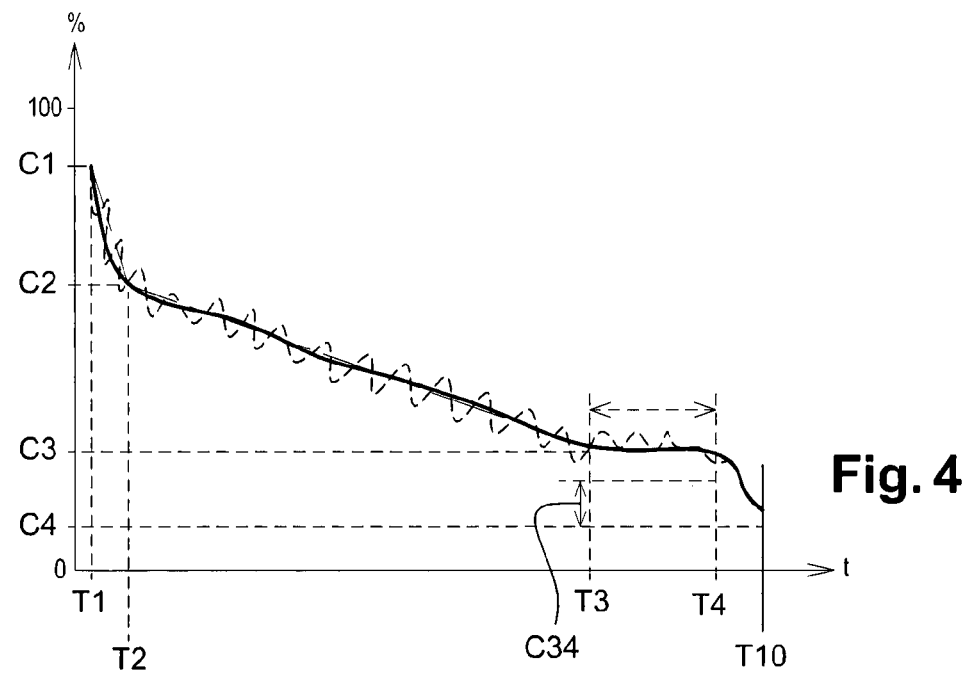
FIG. 4 is a diagram illustrating a controlling method according to a second embodiment of the invention for controlling the hybrid vehicle of FIG. 1 or 2.
Figure 5:
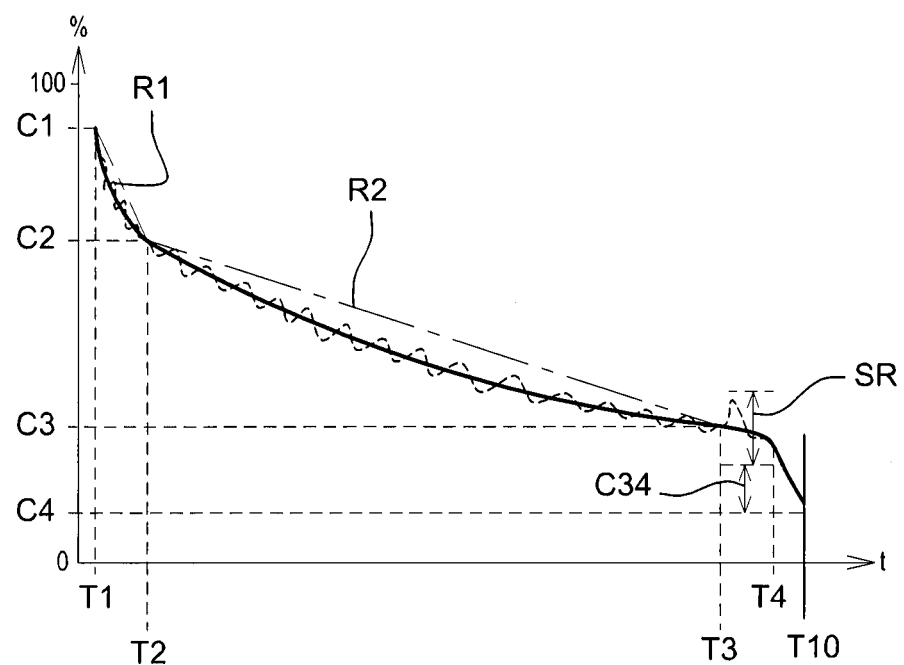
FIG. 5 is a diagram illustrating, a controlling method according to a second embodiment of the invention for controlling the hybrid vehicle of FIG. 1 or 2.

On the curve of FIGS. 3 to 5, a bold, solid line represents a state of charge target which may be followed by the electronic control unit 1 1 as a strategy for controlling the hybrid traction assembly, whereas a dashed line represents a real state of charge. Usually, the real state of charge oscillates around the target state of charge, but depends of course on the instantaneous operating conditions of the vehicle such as the driver torque or brake request, the slope of the road, the weight of the vehicle, etc. A chain dotted line represents a theoretical state of charge variation according to the corresponding mean depletion rate over a given time period.

On FIG. 3, the first mean depletion rate R1 corresponds to a high slope angle. Indeed, the first mean depletion rate R1 is approximately the highest depletion rate complying with the operation of the electric machines and of the battery set. For instance, the first mean depletion rate R1 can be determined depending upon the maximum electric power or current which is admissible by the electric machine and/or by the battery set.

The hybrid traction assembly can be controlled so that a first mean depletion rate R1 can be reached, representing for example more than 80% of the power which one or several of the electric components can absorb or deliver. Preferably, the first mean depletion rate will be at least over 70%, or preferably 80% of the maximum power available from the battery set under the current operating conditions.

This enables to rapidly decrease the state of charge of the battery set.

The initial depleting phase T2–T1 ends, and the second depleting phase T3–T2 begins, at time T2, which can be determined as the moment when the state of charge of the battery reaches set a first threshold C2 at which the battery set becomes able to recover a predetermined amount of electric regenerative energy at a predetermined amount of electric power. This predetermined amount of electric regenerative energy is generated by activation of the retardation means, when hybrid vehicle is going downhill with a significant altitude variation, i.e. on a road with a significant slope, or when the vehicle needs to be stopped from a relatively high speed.

The predetermined amount of electric traction energy and power can be calculated depending on parameters of the hybrid traction assembly, which may include one or several of weight of the hybrid vehicle, temperature of the battery set, state of health of the battery set and/or state of power of the battery set.

In other words, the difference between first threshold C2 and full charge limit C1 should preferably be large enough to enable the battery set to store such a predetermined amount of electric regenerative energy. This ensures that battery set can store electric regenerative energy in full and soon after the beginning of the vehicle mission at time T1.

The second depleting phase T3–T2 extends between the initial depleting phase T2–T1 and the sustaining phase T4–T3.

During the second depleting phase T3–T2, between times T3 and T2, the electronic control system controls the hybrid traction assembly to cause a depletion of the battery set at a second mean depletion rate R2. The second mean depletion rate R2 is lower than the first mean depletion rate R1.

In the example of FIG. 3, during the second depleting phase T3–T2, the state of charge target decreases substantially linearly at a constant rate, which corresponds to rate R2, during the second phase. Alternatively, it could decrease stepwise or following other type of variations, as will be shown in relation to FIG. 5, but in any case the mean rate R2 is lower than R1.

This permits to cause depletion of the battery set, hence to deliver electric traction energy, at a lower depletion rate, thus maximizing the service life of battery set 9S.

Consequently, on FIG. 3, the chain dotted line illustrating the second mean depletion rate R2 forms a lower slope angle than the first mean chain dotted line illustrating the depletion rate R1. In other words, for a given amount of power requested by the driver and all other parameters being equal, the internal combustion engine delivers a higher portion of energy/power during the second depleting phase T3–T2 than during the initial depleting phase T2–T1.

During the sustaining phase T4–T3, the electronic control system can typically control the hybrid traction assembly so as to maintain the state of charge in a predetermined sustaining range SR. In other words, the mean depletion rate is almost zero and hence could be represented by a slope angle close to zero. In other words, during the sustaining phase T4–T3, the state of charge of the battery set oscillates around a state of charge C3. C3 is preferably chosen in the battery's optimal operating state of charge window. The sustaining range SR can be predetermined so as to keep an energy available reserve C34 in case the hybrid vehicle should sustain going uphill with a given gradient. For instance, the energy available reserve C34 can be set to 10% of the battery set capacity. The energy available reserve C34 can be hard-coded in the electronic control system 11S or else be an input parameter.

The state of charge C3, the sustaining rage SR and the energy available reserve can be fixed or can be varied according to a number of parameters, including but not limited to the vehicle weight, vehicle speed, the battery state of health, the type of roads on which the vehicle is moving, etc.

After the sustaining phase T4–T3, a final depleting phase T10–T4 begins shortly before the end T10 of the vehicle mission is expected or anticipated. During the final depleting phase T10–T4, the electronic control system controls the hybrid traction assembly to cause a depletion of the battery set at a final mean depletion rate. The final mean depiction rate is set to reach a predetermined minimum state of charge C4 by the end T10 of the vehicle mission.

This permits to put the battery set into a minimum state of charge before recharging it at a high state of charge for a new vehicle mission. This ensures a maximum utilization of electric energy which was initially stored in the battery set, i.e. maximizing the use of the "plug-in" feature of the vehicle.

The minimum state of charge C4 corresponds to the deepest depletion limit, which is determined so as to maximize the service life of the battery set. Indeed, a battery set must preferably not be completely discharged. The minimum state of charge C4 can be set for instance to a state of charge of 20%.

The duration of the second depleting phase extending between times T2 and T3 is preferably chosen so that it extends as long as possible along the duration of the mission. Ideally, the duration of the second depleting phase is such that there is no need for the sustaining phase. In other words, it is preferable to have T3, the end of the second depletion phase, close to T10, the end of the mission.

For some vehicles, for example performing always the same mission, it is quite easy to anticipate when the mission is going to end, so it is quite easy to determine when time T3 should occur. In such a case, C3 could be a parameter set at a fixed value, like a hard-coded parameter.

Knowing T2, T3 and C2 and C3, the second mean rate of depletion can be calculated as (C3−C2)/(T3−T2). C3 can be replaced for example by C4 or by C4+C34 is that calculation.

If the vehicle has diverse missions, the end of a given mission, or its duration T10 can be calculated or estimated in different ways.

The end of vehicle mission, or its duration, or the end of the second depletion phase T3 can be a parameter set at a changeable value, like a soft-coded. This enables an operator to adapt the end of vehicle mission, thus matching more accurately the expected end with the real end of vehicle mission.

Alternatively, the end T10 of vehicle mission can be a parameter calculated as a function of input mission parameters, which may include one or several of route, distance, altitude variations, road gradient, weight of the hybrid vehicle, road type, ambient temperature, ambient hygrometry, driver's identity, state of health of the battery set, state of power of the battery set, current acceleration, current speed, average speed since beginning of the vehicle mission. Furthermore, the end T10 of vehicle mission may be calculated, for instance in real-time, as a function of computed mission parameters or self-learning parameters, which may include one or several of driving behaviour, usual route, usual distance, usual altitude variations, usual duration, average time of the day by which the mission usually ends, remaining distance to destination using data from a global positioning system.

The hybrid vehicle may be equipped with an electronic device adapted to geographically locate the hybrid vehicle, for example comprising a satellite positioning system which may be connected to a navigation system in which is entered the path of the hybrid vehicle or only the final destination of the corresponding vehicle mission. Using this geographic location, such an electronic device can determine the length or duration of the vehicle mission, either in terms of time or of distance.

The mission duration can also be computed from the average length or duration of previous vehicle missions.

In some applications, a vehicle mission can be considered as a day's work, so that it can be considered that a mission is about to end at a certain time of the day, or after a predetermined amount of time.

Preferably, estimation of the length or duration of the vehicle mission would involve combining several criteria to enhance the reliability of the prediction or expectation. Other parameters than those mentioned above may include information about goods or passengers carried by the vehicle, etc.

In all cases, once the end of the mission T10 is estimated or calculated, it possible to derive time T3 from time T10. If it is desired to implement the final depletion phase, then T3 should be before T10 by a margin at least equal to the expected duration of that final depletion phase. In any case, it is preferable to have time T3 too early before T10, rather than too late.

In the example of FIG. 3, the sustaining phase T4–T3 has a relatively short duration with respect to the duration of the whole mission.

In the example of FIG. 4, the sustaining phase T4–T3 can be longer than the one in the controlling method of FIG. 3.

On the other hand, it can also be chosen to determine the rate R2 without reference to the vehicle end of mission, for example based on best operating conditions for the battery set. This is valid especially if the chosen rate R2 leads to a time T3 which is anyhow before the end of the mission. In any case, it is also possible to end the second depletion phase when the state of charge falls below a retain threshold, for example below C3, or below C3+C34, or when is stays below that threshold for a certain amount of time.

FIG. 5 depicts an alternative controlling method similar to the one depicted in relation with FIG. 3, except that the state of charge target (solid line) follow a curve which is approximately a parabola. The second mean depletion rate R2 is about the same as on FIG. 3. According to other non illustrated alternatives, the state of charge target may be stepwise or discrete.

Besides, a controlling method according to the present invention can adapt the minimum state of charge to the severity of vehicle usage, including parameters like peak regenerative power, number of cycles per year, ambient temperature.

Of course, the invention is not restricted to the embodiments described above by way of non-limiting examples, but on the contrary it encompasses all embodiments thereof.

The invention claimed is:

1. A method for controlling a hybrid traction assembly of a hybrid vehicle, the hybrid traction assembly, the hybrid traction assembly comprising at least:
   an internal combustion engine;
   at least one electric machine which can be mechanically coupled to the driving wheels so as to perform traction of the hybrid vehicle the at least one electric machine being suitable for generating electric regenerative energy when the hybrid vehicle slows down; and
   a storage device suitable for delivering electric traction energy to the electric machine and for recovering electric regenerative energy from the electric, generator, wherein the storage device can be connected to an external source of electric power so as to charge the storage device at a high state of charge before a beginning of a vehicle mission;
comprising:
   controlling, by an electronic control system, the hybrid traction assembly to cause an initial depleting phase of the storage device at a first mean depletion rate, the the initial depleting rate beginning at the beginning of the vehicle mission and the first mean depletion rate being a high depletion rate;
   controlling, by the electronic control system, the hybrid traction assembly to cause at least one sustaining phase of the storage device such that the state of charge of the storage device is maintained in a predetermined sustaining, range; and
   controlling, by the electronic control system, the hybrid traction assembly to cause a second depleting phase of the storage device at a second mean depletion rate, the second depleting phase extending between the initial depleting phase and the sustaining phase and the second mean depletion rate being lower than the first mean depletion rate.

2. A method according to claim 1, comprising, after performing the sustaining phase, performing a final depleting phase which begins shortly before when the end of the vehicle mission is expected and where the hybrid traction assembly is controlled to cause depletion of the storage device at a final mean depletion rate, the final mean depletion rate being set to reach a predetermined minimum state of charge by the end of the vehicle mission.

3. A method according to claim 1, wherein the second depleting phase begins when the state of charge reaches as first threshold at which the storage device becomes able to recover a predetermined amount of electric regenerative energy and/or power.

4. A method according to claim 3, wherein the predetermined amount of electric traction energy and/or power is calculated depending on parameters of the hybrid traction assembly which may include weight of the hybrid vehicle, temperature of the storage device, state of health of the storage device, and/or state of power of the storage device.

5. A method according to claim 1, wherein the second depleting phase ends at a time depending on an expected end of the vehicle mission, preferably at a time close to the expected end of the vehicle mission.

6. A method according to claim 1, wherein, during the second depleting phase, the hybrid traction assembly is controlled so that a state of charge target of the storage device is approximately constant, curved or stepwise.

7. A method according to claim 1, wherein the first mean depletion rate is set such that the electric traction power represents more than 70%, preferably 80%, of the maximum power available from the storage device under the current operating conditions.

8. A method according to claim 1, wherein the end of the vehicle mission is a parameter set at a fixed value, like a hard-coded parameter.

9. A method according to claim 1, wherein the end of the vehicle mission is a parameter set at a changeable value, like a soft-coded parameter.

10. A method according to claim 1, wherein the end of the vehicle mission is a parameter calculated as a function of:
    input mission parameters, which may include one or several of route, distance, altitude variations, road gradient, weight of the hybrid vehicle, road type, ambient temperature, ambient hygrometry, driver's identity, state of health of the storage device, state of power of the storage device, current acceleration, current speed, average speed since beginning of the vehicle mission; and/or
    computed mission parameters, which may include one or several of driving behaviour, usual route, usual distance, usual altitude variations, usual duration, average time of the day by which the mission usually ends, remaining distance to destination using data from a global positioning system.

11. A method according to claim 10, wherein the end of the second depleting phase is a function of the end of the vehicle mission.

12. A method according to claim 11, wherein the end of the second depleting phase is selected in the range of 50% to 95%, preferably 60% to 90%, of the end of the vehicle mission.

13. A hybrid vehicle having, especially an industrial vehicle, a hybrid traction assembly which comprises:
    at least one internal combustion engine;
    an electric machine mechanically coupled to the driving wheels so as to perform traction of the hybrid vehicle the at least one electric machine being suitable for generating electric regenerative energy when the hybrid vehicle slows down;
    a storage device for delivering electric traction energy to the electric motor and for recovering electric regenerative energy from the electric generator, the storage device comprising a connector for connection to an external source of electric power;
    an electronic control system suitable for controlling the hybrid traction assembly so as to carry out a method according to claim 1.

* * * * *